(12) United States Patent
Liu

(10) Patent No.: US 11,997,212 B2
(45) Date of Patent: May 28, 2024

(54) PAYLOAD VALIDATION FOR A MEMORY SYSTEM

(71) Applicant: Micron Technology, Inc., Boise, ID (US)

(72) Inventor: Zhan Liu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 937 days.

(21) Appl. No.: 16/453,909

(22) Filed: Jun. 26, 2019

(65) Prior Publication Data

US 2020/0412545 A1    Dec. 31, 2020

(51) Int. Cl.
*H04L 9/32*  (2006.01)
*G06F 3/06*  (2006.01)

(52) U.S. Cl.
CPC .......... *H04L 9/3247* (2013.01); *G06F 3/0623* (2013.01); *G06F 3/0659* (2013.01); *G06F 3/0673* (2013.01); *H04L 9/3242* (2013.01)

(58) Field of Classification Search
CPC ........ H04L 9/32; H04L 9/3242; G06F 3/0623
USPC ....................................................... 713/176
See application file for complete search history.

(56) References Cited

U.S. PATENT DOCUMENTS

| 10,110,385 | B1 * | 10/2018 | Rush ..................... H04L 9/3234 |
| 11,050,572 | B2 * | 6/2021  | Steele .................. H04L 9/3239 |
| 11,216,591 | B1 * | 1/2022  | Burton ................. H04L 9/0643 |
| 2005/0091545 | A1 * | 4/2005 | Soppera ............... H04L 63/126 |
| | | | 726/19 |
| 2009/0089584 | A1 * | 4/2009 | Bender ............... H04W 12/106 |
| | | | 713/176 |
| 2010/0275028 | A1 * | 10/2010 | Takashima ........... H04L 9/3247 |
| | | | 714/E11.002 |
| 2011/0129088 | A1 * | 6/2011 | Lee ....................... H04L 9/3242 |
| | | | 380/44 |

(Continued)

FOREIGN PATENT DOCUMENTS

| CN | 109802825 A | 5/2019 |
| CN | 113826071 A | 12/2021 |

OTHER PUBLICATIONS

Chinese Patent Office, "Office Action," issued in connection with Chinese Patent Application No. 202010579973.0 dated Oct. 20, 2023 (12 pages) (5 pages of English Translation and 7 pages of Original Document).

*Primary Examiner* — Teshome Hailu
(74) *Attorney, Agent, or Firm* — Holland & Hart LLP

(57) ABSTRACT

Methods, systems, and devices for payload validation for a memory system are described. A payload receiver may be a device that includes an array of memory cells configured to store data, and a payload transmitter may be a host of a payload receiver (e.g., a host device) or another device that is in communication with the payload receiver. A payload receiver may be configured to receive an information payload and a signature associated with the information payload. The received signature may be based on the information payload and an identifier of the payload receiver previously provided to the payload transmitter. The payload receiver may generate a signature based on the information payload and the identifier of the payload receiver (e.g., as stored or cached at the payload receiver), and authenticate the information payload based on the received signature and the generated signature.

19 Claims, 7 Drawing Sheets

(56) References Cited

U.S. PATENT DOCUMENTS

| | | | |
|---|---|---|---|
| 2014/0032915 A1* | 1/2014 | Muzammil | H04L 9/3247 |
| | | | 713/176 |
| 2015/0006900 A1* | 1/2015 | Gallant | H04L 9/3252 |
| | | | 713/176 |
| 2015/0363187 A1* | 12/2015 | Dhar | G06F 8/65 |
| | | | 713/2 |
| 2017/0192902 A1* | 7/2017 | Hwang | G06F 12/0246 |
| 2018/0025145 A1* | 1/2018 | Morgner | H04L 63/045 |
| | | | 726/4 |
| 2018/0114220 A1* | 4/2018 | Ekberg | G06Q 20/3829 |
| 2018/0117446 A1* | 5/2018 | Tran | A42B 3/0433 |
| 2019/0036688 A1* | 1/2019 | Wasily | H04L 9/3231 |
| 2020/0310776 A1 | 10/2020 | Troia et al. | |

\* cited by examiner

PAYLOAD VALIDATION FOR A MEMORY SYSTEM

BACKGROUND

The following relates generally to a system that includes at least one memory device and more specifically to payload validation for a memory system.

Memory devices are widely used to store information in various electronic devices such as computers, wireless communication devices, cameras, digital displays, and the like. Information is stored by programing different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

In some systems, a device configured to receive information payloads (e.g., for storage in a memory array) may be capable of receiving such payloads from multiple devices. Some information payloads may not be intended for a particular receiving device or may contain a payload that could cause adverse behavior to a particular receiving device (e.g., from a transmitter of an adverse payload).

DETAILED DESCRIPTION

Figure 1:
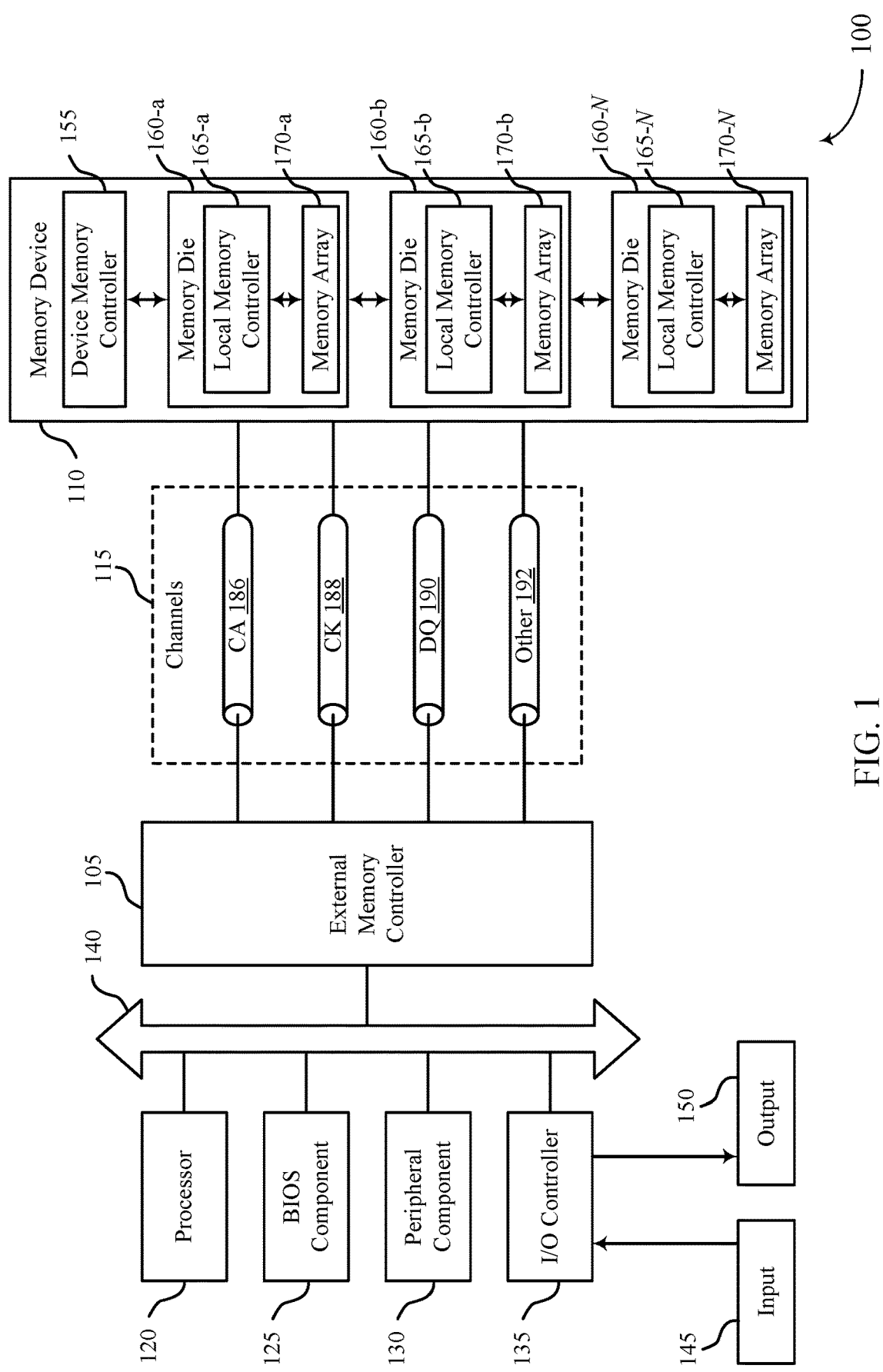
FIG. 1 illustrates an example of a system that supports payload validation for a memory system in accordance with examples as disclosed herein.

Systems and techniques for payload validation in a memory system are described. In a system that supports information payload transfer, devices participating in a particular payload transfer may be considered a "payload transmitter" and a "payload receiver." In some examples, a payload receiver may be a device that includes an array of memory cells configured to store data, and a payload transmitter may be a host or server of a payload receiver (e.g., a host device) that is in communication with the payload receiver. In some systems, a payload receiver may be configured in a manner that supports receiving information payloads from various sources or devices.

Some devices perform a replay attack or playback attack on a payload receiver. For example, a payload receiver may be configured to exchange information with a potential payload transmitter, which, in some examples, may include authentication information (e.g., authentication keys, keying information). Another device may detect or intercept a payload exchange between a payload transmitter and a payload receiver, and the other device may record one or more aspects of the detected payload exchange such as the authentication information. In some cases, the other device (e.g., an adverse device) may replay intercepted or recorded authentication information, such that a payload receiver may be exposed to adverse information payloads from the other device, such as information not intended for the payload receiver, malicious information, information that could cause adverse operation of the payload receiver, and others. Thus, it may be beneficial to perform authentication on various aspects of payload transfer prior to a payload receiver performing operations on received information payloads, where such subsequent operations may include storing information payloads, forwarding information payloads, or otherwise processing information payloads.

The described techniques may support various forms of authentication, at a payload receiver, of a payload transmitter or an information payload received from a payload transmitter. Techniques may use an identifier of the payload receiver device to authenticate the sources of payloads. One example of a payload receiver may be a memory device that includes a receiving component configured to receive an information payload and a first signature that is associated with the information payload. The received first signature may be configured to provide authentication information associated with the information payload or the payload transmitter (e.g., sender authentication), and may be based on the information payload and an identifier of the memory device that was previously provided to the payload transmitter (e.g., during an initialization operation, during a handshake operation, in response to a request from the payload transmitter, as a preconfigured register value). The memory device may generate a second signature based on the received information payload and the identifier of the memory device (e.g., as stored or cached at the memory device), and may authenticate the information payload based on the received first signature and the generated second signature. In some examples, the memory device may authenticate the information payload when the second signature matches the first signature.

Thus, in accordance with examples of the present disclosure, a payload receiver may authenticate a payload transmitter, or an information payload received from a payload transmitter, based on signatures that are generated based on an identifier of a device that corresponds to the payload receiver. A system (e.g., a memory system) may determine whether or not to perform various subsequent operations with the information payload (e.g., store the information payload, forward the information payload, process the information payload) based on whether the payload transmitter or the information payload has been authenticated. In cases where the payload transmitter or the information payload is not authenticated, the payload receiver may ignore the information payload, or perform some other operation (e.g., blocking payloads from the payload transmitter, flagging the payload transmitter as inauthentic to a system, flagging the payload transmitter as malicious to the system) using a determination that the payload transmitter or the information payload is invalid, inauthentic, not trusted, or malicious.

Figure 2:
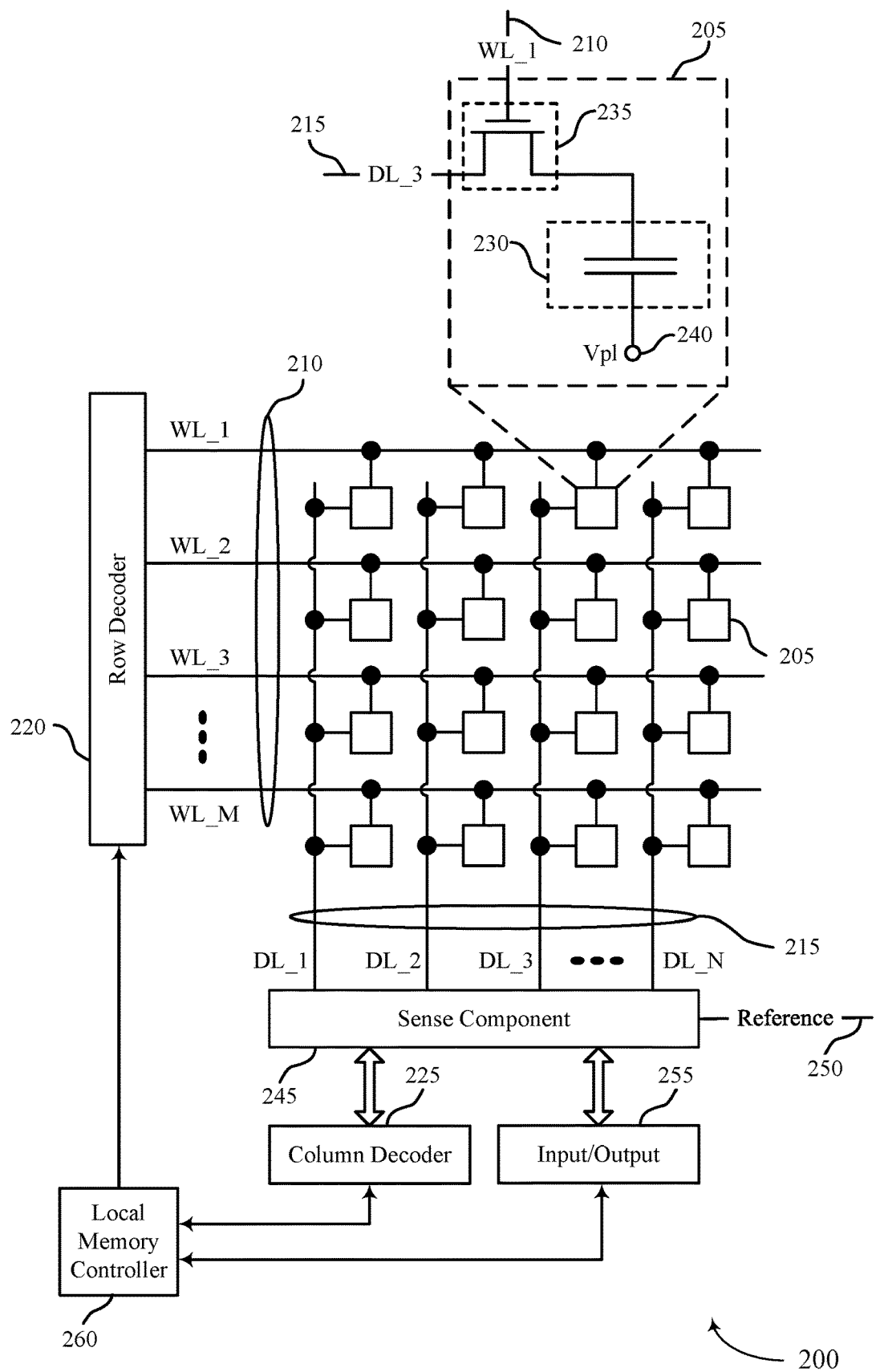
FIG. 2 illustrates an example of a memory die that supports payload validation for a memory system in accordance with examples as disclosed herein.

Features of the disclosure are initially described in the context of a memory system and memory die with reference to FIGS. 1 and 2. Features of the disclosure are further described in the context of operations of a system with a payload transmitter and a payload receiver with reference to FIG. 3. These and other features of the disclosure are further illustrated by and described with reference to apparatus diagrams and flowcharts that relate to payload validation for a memory system as described with references to FIGS. 4-7.

FIG. 1 illustrates an example of a system 100 that utilizes one or more memory devices in accordance with examples as disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include portions of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be component of the system configured to store data for one or more other components of the system 100. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host or host device. In some examples, system 100 is a graphics card.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose GPU (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or specialized graphics ports. The peripheral component(s) 130 may be other components understood by those skilled in the art as peripherals.

The I/O controller 135 may manage data communication between the processor 120 and the peripheral component(s) 130, inputs 145, or outputs 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or information interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, a user interface or information interface, and so forth. In some cases, the output 150 may be a peripheral that interfaces with the system 100 via one or more peripheral components 130 or may be managed by the I/O controller 135.

The memory device 110 may include a device memory controller 155 and one or more memory dice 160. Each memory die 160 may include a local memory controller 165 (e.g., local memory controller 165-a, local memory controller 165-b, or local memory controller 165-N) and a memory array 170 (e.g., memory array 170-a, memory array 170-b, or memory array 170-N). A memory array 170 may be a collection (e.g., a grid) of memory cells, with each memory cell being configured to store at least one bit of digital data. Features of memory arrays 170 or memory cells are described in more detail with reference to FIG. 2.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-a, memory die 160-b, or any quantity of memory dice 160-N). In a 3D memory device, a plurality of memory dice 160-N may be stacked on top of one another or next to one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both. In some 3D memory device, different decks may share at least one common access line such that some decks may share at least one of a word line, a digit line, or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may, in some cases, be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel.

In some cases, a pin or pad of a terminal may be part of to a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data channel 190 may be ×4 (e.g., including four signal paths), ×8 (e.g., including eight signal paths), ×16 (including sixteen signal paths), and so forth. Signals communicated over the channels may use double data rate (DDR) signaling. For example, some symbols of a signal may be registered on a rising edge of a clock signal and other symbols of the signal may be registered on a falling edge of the clock signal. Signals communicated over channels may use single data rate (SDR) signaling. For example, one symbol of the signal may be registered for each clock cycle.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge, or a falling clock signal edge, or both. In some cases, a CA channel 186 may include any number of signal paths to decode address and command data (e.g., eight or nine signal paths).

In some cases, the channels 115 may include one or more clock signal (CK) channels 188. The CK channels 188 may be configured to communicate one or more common clock signals between the external memory controller 105 and the memory device 110. Each clock signal may be configured to oscillate between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (DQ) channels 190. The data channels 190 may be configured to communicate data or control information between the external memory controller 105 and the memory device 110. For example, the data channels 190 may communicate information (e.g., bi-directional) to be written to the memory device 110 or information read from the memory device 110. In some cases, the channels 115 may include one or more other channels 192 that may be dedicated to other purposes. These other channels 192 may include any quantity of signal paths.

In some cases, the other channels 192 may include one or more write clock signal (WCK) channels. While the 'W' in WCK may nominally stand for "write," a write clock signal WCK (e.g., a WCK t signal and a WCK_c signal) may provide a timing reference for access operations generally for the memory device 110 (e.g., a timing reference for both read and write operations). Accordingly, the write clock signal WCK may also be referred to as a data clock signal WCK. The WCK channels may be configured to communicate a common data clock signal between the external memory controller 105 and the memory device 110. The data clock signal may be configured to coordinate an access operation (e.g., a write operation or read operation) of the external memory controller 105 and the memory device 110. In some cases, the write clock signal may be a differential output (e.g., a WCK t signal and a WCK_c signal) and the signal paths of the WCK channels may be configured accordingly. A WCK channel may include any quantity of signal paths. The data clock signal WCK may be generated by a data clock, which may include one or more hardware components (e.g., oscillators, crystals, logic gates, transistors, or the like).

In some cases, the other channels 192 may include one or more error detection code (EDC) channels. The EDC channels may be configured to communicate error detection signals, such as checksums, to improve system reliability. An EDC channel may include any quantity of signal paths.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer. Signals communicated over the channels 115 may be modulated using a variety of different modulation schemes.

The system 100 may support various forms of information payload transfer, and components or devices participating in a particular payload transfer may be considered as a "payload transmitter" and a "payload receiver." In one example of the described techniques for payload validation, the memory device 110 may be considered as a payload receiver, and the external memory controller 105 or the input 145 (e.g., a device external to the system 100) may be considered as a payload transmitter. Thus, the memory device 110 may include a receiving component (e.g., of the device memory controller 155) configured to receive an information payload and a first signature that is associated with the information payload. The received first signature may be based on the information payload and an identifier of the memory device 110 that was previously provided to the payload transmitter (e.g., during an initialization operation, during a handshake operation, in response to a request from the payload transmitter). The memory device 110 may generate a second signature based on the received information payload and the identifier of the memory device 110 (e.g., as stored or cached at the memory device 110 or the device memory controller 155), and attempt to authenticate the information payload based on the received first signature and the generated second signature. Thus, the memory device 110 may authenticate a payload transmitter, or an information payload received from a payload transmitter, based on signatures that are generated based on a device identifier corresponding to the memory device 110. The memory device 110 may accordingly determine whether or not to perform various subsequent operations with the information payload based on whether the payload transmitter or the information payload has been authenticated or not.

In another example of the described techniques for payload validation, the memory device 110 may be considered as a payload transmitter, and the external memory controller 105 (e.g., a host device) may be considered as a payload receiver. Thus, the external memory controller 105 may include a receiving component configured to receive, from the memory device 110, an information payload and a first signature that is associated with the information payload. The received first signature may be based on the information payload and an identifier of the external memory controller 105 that was previously provided to the memory device 110 (e.g., during an initialization operation, during a handshake operation, in response to a request from the payload transmitter). The external memory controller 105 may generate a second signature based on the received information payload and the identifier of the external memory controller 105 (e.g., as stored or cached at the external memory controller 105), and attempt to authenticate the information payload received from the memory device 110 based on the received first signature and the generated second signature. Thus, the external memory controller 105 may authenticate a payload transmitter, or an information payload received from a payload transmitter, based on signatures that are generated based on a device identifier corresponding to the external memory controller 105. The external memory controller 105 may accordingly determine whether or not to perform various subsequent operations with the information payload based on whether the payload transmitter or the information payload has been authenticated or not.

In another example of the described techniques for payload validation, the system 100 may be considered as a payload receiver, and the input 145 (e.g., a device external to the system 100) may be considered as a payload transmitter. Thus, the system 100 may include a receiving component (e.g., of I/O controller 135, of the peripheral component 130, of the processor 120, of the external memory controller 105, of a host device) configured to receive (e.g., from the device external to the system 100) an information payload and a first signature that is associated with the information payload. The received first signature may be based on the information payload and an identifier of the system 100 that was previously provided to the payload transmitter (e.g., during an initialization operation, during a handshake operation, in response to a request from the payload transmitter). The system 100 may generate a second signature (e.g., at the processor 120, at the external memory controller 105) based on the received information payload and the identifier of the system 100 (e.g., as stored or cached at the external memory controller 105 or the memory device 110), and attempt to authenticate the information payload based on the received first signature and the generated second signature. Thus, the system 100 may authenticate a payload transmitter, or an information payload received from a payload transmitter, based on signatures that are generated based on a device identifier corresponding to the system 100. The system 100 may accordingly determine whether or not to perform various subsequent operations with the information payload based on whether the payload transmitter or the information payload has been authenticated or not.

FIG. 2 illustrates an example of a memory die 200 in accordance with examples as disclosed herein. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11).

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials, phase change materials, resistance change materials, or others may be employed.

Operations such as reading and writing may be performed on memory cells 205 by activating or selecting access lines such as a word line 210 or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line.

The memory die 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. For example, the memory die 200 may include multiple word lines 210, labeled WL_1 through WL_M, and multiple digit lines 215, labeled DL_1 through DL_N, where M and N depend on the size of the memory array. Thus, by activating a word line 210 and a digit line 215, e.g., WL_1 and DL_3, the memory cell 205 at their intersection may be accessed. The intersection of a word line 210 and a digit line 215, in either a two-dimensional or three-dimensional configuration, may be referred to as an address of a memory cell 205.

The memory cell 205 may include a logic storage component, such as capacitor 230 and a switching component 235. The capacitor 230 may be an example of a dielectric capacitor or a ferroelectric capacitor. A first node of the capacitor 230 may be coupled with the switching component 235 and a second node of the capacitor 230 may be coupled with a voltage source 240. In some cases, the voltage source 240 may be the cell plate reference voltage, such as Vpl, or may be ground, such as Vss. In some cases, the voltage source 240 may be an example of a plate line coupled with a plate line driver. The switching component 235 may be an example of a transistor or any other type of switch device that selectively establishes or de-establishes electronic communication between two components.

Selecting or deselecting the memory cell 205 may be accomplished by activating or deactivating the switching component 235. The capacitor 230 may be in electronic communication with the digit line 215 using the switching component 235. For example, the capacitor 230 may be isolated from digit line 215 when the switching component 235 is deactivated, and the capacitor 230 may be coupled with digit line 215 when the switching component 235 is activated. In some cases, the switching component 235 is a transistor and its operation may be controlled by applying a voltage to the transistor gate, where the voltage differential between the transistor gate and transistor source may be greater or less than a threshold voltage of the transistor. In some cases, the switching component 235 may be a p-type transistor or an n-type transistor. The word line 210 may be in electronic communication with the gate of the switching component 235 and may activate/deactivate the switching component 235 based on a voltage being applied to word line 210.

A word line 210 may be a conductive line in electronic communication with a memory cell 205 that is used to perform access operations on the memory cell 205. In some architectures, the word line 210 may be in electronic communication with a gate of a switching component 235 of a memory cell 205 and may be configured to control the switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be configured to couple or isolate the capacitor 230 of the memory cell 205 and the digit line 215. In some architectures, the memory cell 205 may be in electronic communication (e.g., constant) with the digit line 215.

The sense component 245 may be configured to detect a state (e.g., a charge) stored on the capacitor 230 of the memory cell 205 and determine a logic state of the memory cell 205 based on the stored state. The charge stored by a memory cell 205 may be extremely small, in some cases. As such, the sense component 245 may include one or more sense amplifiers to amplify the signal output by the memory cell 205. The sense amplifiers may detect changes in the charge of a digit line 215 during a read operation and may produce signals corresponding to a logic state 0 or a logic state 1 based on the detected charge. During a read operation, the capacitor 230 of memory cell 205 may output a signal (e.g., discharge a charge) to its corresponding digit line 215. The signal may cause a voltage of the digit line 215 to change. The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary-signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0. The detected logic state of the memory cell 205 may be provided as an output of the sense component 245 (e.g., to an input/output 255), and may indicate the detected logic state to another component of a memory device 110 that includes the memory die 200, such as a device memory controller 155 (e.g., directly or using the local memory controller 260).

The local memory controller 260 may control the operation of memory cells 205 through the various components (e.g., row decoder 220, column decoder 225, and sense component 245). The local memory controller 260 may be an example of the local memory controller 165 described with reference to FIG. 1. In some cases, one or more of the row decoder 220, column decoder 225, and sense component 245 may be co-located with the local memory controller 260. The local memory controller 260 may be configured to receive commands or data from an external memory controller 105 (or a device memory controller 155 described with reference to FIG. 1), translate the commands or data into information that can be used by the memory die 200, perform one or more operations on the memory die 200, and communicate data from the memory die 200 to the external memory controller 105 (or the device memory controller 155) in response to performing the one or more operations. The local memory controller 260 may generate row and column address signals to activate the target word line 210 and the target digit line 215. The local memory controller 260 may also generate and control various voltages or currents used during the operation of the memory die 200. In general, the amplitude, shape, or duration of an applied voltage or current discussed herein may be adjusted or varied and may be different for the various operations discussed in operating the memory die 200.

In some cases, the local memory controller 260 may be configured to perform a write operation (e.g., a programming operation) on one or more memory cells 205 of the memory die 200. During a write operation, a memory cell 205 of the memory die 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a specific signal (e.g., voltage) to the digit line 215 during the write operation to store a specific state (e.g., charge) in the capacitor 230 of the memory cell 205, the specific state (e.g., charge) may be indicative of a desired logic state.

In some cases, the local memory controller 260 may be configured to perform a read operation (e.g., a sense operation) on one or more memory cells 205 of the memory die

200. During a read operation, the logic state stored in a memory cell 205 of the memory die 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The target memory cell 205 may transfer a signal to the sense component 245 in response to biasing the access lines. The sense component 245 may amplify the signal. The local memory controller 260 may fire the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation.

In some memory architectures, accessing the memory cell 205 may degrade or destroy the logic state stored in a memory cell 205. For example, a read operation performed in DRAM architectures may partially or completely discharge the capacitor of the target memory cell. The local memory controller 260 may perform a re-write operation or a refresh operation to return the memory cell to its original logic state. The local memory controller 260 may re-write the logic state to the target memory cell after a read operation. In some cases, the re-write operation may be considered part of the read operation. Additionally, activating a single access line, such as a word line 210, may disturb the state stored in some memory cells in electronic communication with that access line. Thus, a re-write operation or refresh operation may be performed on one or more memory cells that may not have been accessed.

In one example of the described techniques for payload validation, at least a portion of the memory die 200 may be considered as a payload receiver, and a device memory controller 155, an external memory controller 105, or an input 145 may be considered as a payload transmitter. The memory die 200 may include a receiving component (e.g., of the local memory controller 260) configured to receive an information payload and a first signature that is associated with the information payload. The received first signature may be based on the information payload and a device identifier (e.g., of the memory die 200) that was previously provided to the payload transmitter (e.g., during an initialization operation, during a handshake operation, in response to a request from the payload transmitter). The memory die 200 may generate a second signature based on the received information payload and the device identifier (e.g., as stored or cached at the memory die 200 or the local memory controller 260), and attempt to authenticate the information payload based on the received first signature and the generated second signature. Thus, the memory die 200 may authenticate a payload transmitter, or an information payload received from a payload transmitter, based on signatures that are generated based on a device identifier corresponding to the memory die 200. The memory die 200 may accordingly determine whether or not to perform various subsequent operations with the information payload based on whether the payload transmitter or the information payload has been authenticated or not.

In another example of the described techniques for payload validation, at least a portion of the memory die 200 may be considered as a payload transmitter. Thus, in some examples, the memory die 200 (e.g., the local memory controller 260) may be configured to identify an identifier associated with or corresponding to payload receiver (e.g., a host device, an external memory controller 105), and generate a signature associated with an information payload for the payload receiver. The signature generated by the memory die 200 may be based at least in part on the information payload and the identifier associated with or corresponding to the payload receiver, and may be configured to provide sender authentication of the information payload to the payload receiver (e.g., the host device, the external memory controller). Accordingly, the memory die 200 may be configured to transmit the information payload and the signature to the payload receiver.

Figure 3:
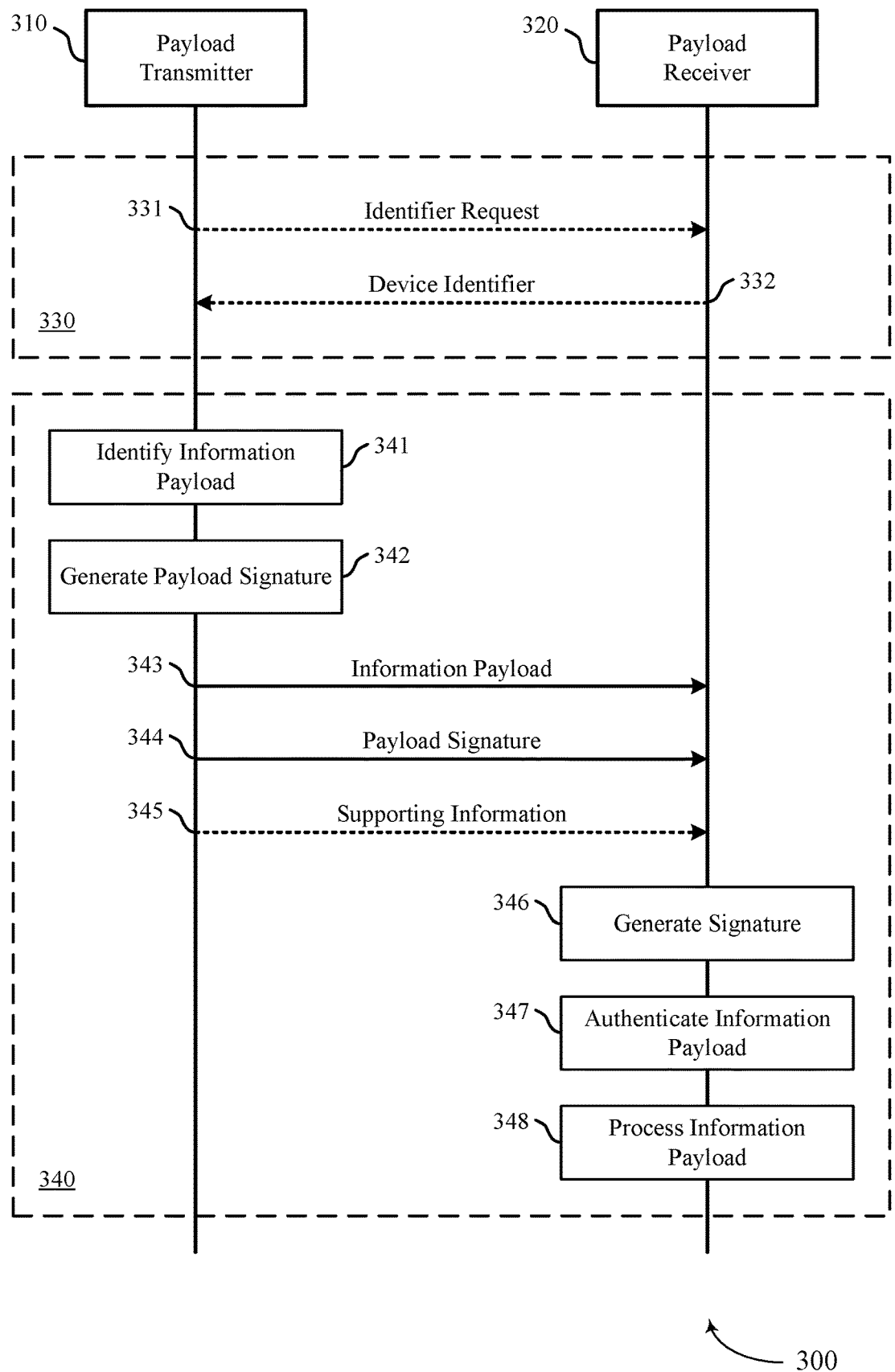
FIG. 3 illustrates an example of a system that supports payload validation for a memory system in accordance with examples as disclosed herein.

FIG. 3 illustrates an example of a system 300 that supports payload validation for a memory system in accordance with examples as disclosed herein. The system 300 includes a payload transmitter 310 and a payload receiver 320. In an illustrative example, the payload receiver 320 may be a memory device, such as a memory device 110 described with reference to FIG. 1, and the payload transmitter 310 may be a host device (e.g., a host of the memory device of the payload receiver 320, a device that uses the memory device of the payload receiver to store information, a central server). However, in various scenarios of information payload transfer, other components or devices may correspond to the payload transmitter 310 and the payload receiver 320. For example, the payload transmitter 310 may be an example of a server or other external computing device and the payload receiver 320 may be an example of a memory device, a host device, a memory system, or any other device. The system 300 may be configured to support the described techniques for payload validation, which may include the generation and communication of signatures based on a device identifier corresponding to the payload receiver 320.

To support the described techniques for payload validation, the payload transmitter 310 may acquire or otherwise identify a device identifier of the payload receiver 320 through various configurations, signaling, or other operations. In one example, the payload transmitter may acquire an identifier of the payload receiver 320 through signaling 330, which may refer to a request and response acquisition.

At 331, the payload transmitter 310 may transmit an identifier request, which may be received by the payload receiver 320. The identifier request at 331 may be triggered or initiated at the payload transmitter 310 according to various conditions or techniques. For example, such a request may be triggered as part of an initialization or handshake operation, such as an initial installation, coupling, or communication between the payload transmitter 310 and the payload receiver 320. In some examples, such a request for an identifier may be triggered based on an identified information payload for the payload receiver 320, in which case the request at 331 (e.g., the signaling 330) may follow operations associated with identifying an information payload at 341.

At 332, the payload receiver 320 may transmit an identifier corresponding to the payload receiver 320 (e.g., a "DeviceID"), which may be received by the payload transmitter 310. In various examples, the device identifier may be configured at the payload receiver 320 (e.g., a static identifier, a preconfigured identifier), or the device identifier may be generated at the payload receiver 320 (e.g., an identifier determined at the payload receiver 320 upon startup or initialization, an identifier randomly determined by the payload receiver 320). In various examples, the identifier corresponding to the payload receiver 320 may be specific to the payload transmitter 310 (e.g., corresponding to or otherwise specific to the payload transmitter 310 or the identifier request of 331), or the identifier corresponding to the payload receiver 320 may be applicable to more than one payload transmitter 310 (e.g., generally applicable to payload transfer between the payload receiver 320 and any payload transmitter 310). The DeviceID may be specific to a memory device (e.g., a memory device) or may be specific to a device associated with a memory device (e.g., a host device).

Although the system 300 is illustrated in the context of request and response signaling 330, a payload transmitter 310 may acquire the identifier of the payload receiver 320 through other operations. For example, the payload transmitter 310 may be configured with the identifier of the payload receiver 320 prior to communications with the payload receiver 320 (e.g., according to a preconfiguration, according to a register value of the payload transmitter 310 prior to installation of, or other communicative coupling with the payload receiver 320). In some examples, the payload transmitter 310 may receive the identifier of the payload receiver 320 from a device different than the payload receiver 320, such as from a coordinating device, a control authority, or other central controller, which may or may not be triggered by a payload transmitter 310.

In some examples, the signaling 300 or other communications of the payload transmitter 310 or the payload receiver 320 may include additional information that supports the described techniques for payload validation. For example, to support aspects of certain key-based payload validation or authentication protocols, the payload transmitter 310 may be configured with a public key (TransmitterPuK) and a private key (TransmitterPrK). In such examples, the payload transmitter 310 may be configured to provide its public key, TransmitterPuK, to the payload receiver 320. Additionally or alternatively, the payload receiver 320 may be configured with a public key (DevicePuK) and a private key (DevicePrK). In such examples, the payload receiver 320 may be configured to provide its public key, DevicePuK, to the payload transmitter 310. In some examples, the system 300 may be configured for a key exchange between the payload transmitter 310 and the payload receiver 320, which may support the system 300 being configured according to an asymmetric key system.

To support payload transfer, the system 300 may be configured for operations such as payload operations 340, which may refer to an example of operations and signaling that support the described techniques for payload validation based at least in part on an identifier corresponding to the payload receiver 320.

At 341, the payload transmitter 310 may identify an information payload. The information payload may refer to information specifically designated for the payload receiver 320, or to information designated for a set of more than one payload receiver 320 that includes the illustrated payload receiver 320. When the information payload is designated for more than one payload receiver 320, the payload transmitter may perform subsequent operations (e.g., the operations of 342 through 345) separately and uniquely for each of the set of payload receivers 320 (e.g., based on respective device identifiers corresponding to each of the set of payload receivers 320).

At 342, the payload transmitter 310 may generate a payload signature, which may be referred to as "signature1" (e.g., a transmitter-generated signature). The payload signature generated at 342 may be based at least in part on the information payload (e.g., as identified at 341) and the identifier corresponding to the payload receiver 320 (e.g., as received at 332). In some examples, the payload signature may be an output of a hash function that includes at least the information payload, or some portion thereof, and the device identifier.

In some examples, the payload signature generated at 342 may be based on additional information, which may or may not have been previously communicated between the payload transmitter 310 and the payload receiver 320. For example, the payload signature generated at 342 may be based at least in part on a nonce value, where such a nonce value may be generated at the payload transmitter 310 and communicated to the payload receiver 320 (e.g., in signaling 330, in payload operations 340), or generated at the payload receiver 320 and communicated to the payload transmitter 310 (e.g., in signaling 330, in payload operations 340), or generated at some other central authority and communicated to both the payload transmitter 310 and the payload receiver 320.

In some examples, a payload signature generated at 342 may be based at least in part on a monotonic count value that may be shared between or otherwise maintained between the payload transmitter 310 and the payload receiver 320. For example, during an initialization or handshake operation, a monotonic count value may be set to an initial value (e.g., an initialized value, a zero value) at both the payload transmitter 310 and the payload receiver 320. Upon various operations, the monotonic count value may be incremented by both of the payload transmitter 310 and the payload receiver 320, or the monotonic count value may be incremented at one of the payload transmitter 310 or the payload receiver 320, and the incremented monotonic count value itself, or an indication of the incrementing, may be communicated to the other of the payload transmitter 310 or the payload receiver 320. However, in a system that does not include other aspects of authentication, such as those described herein, an adverse device (e.g., an adverse payload transmitter) may detect a communication having a particular value of a monotonic count, and may generate an inauthentic signature based on the detected count value, or may replay a detected signature as an inauthentic signature. The inauthentic signature may be transmitted by the adverse device, which may be received by one or more payload receivers as valid or authentic. In other words, if the inauthentic signature is legitimated, the adverse device may successfully perform a replay attack. Thus, as described herein, the system 300 may perform additional operations and signaling, including those based on a device identifier corresponding to the payload receiver 320.

In an illustrative example where the payload signature generated by the payload transmitter 310 at 342 is based on the identifier corresponding to the payload receiver 320 (e.g., as received at 332), a nonce value, a monotonic count, and the information payload (e.g., as identified at 314), the payload signature may be generated according to a formula that generally takes the form of:

signaturea=Hash(DeviceId, nonce, monotonic count, payload)

where, the referenced "Hash" may be a hash function of various configurations. In some examples, the payload transmitter 310 may generate an encrypted payload signature at 342. For example, signature1 as calculated above may be further signed by the private key of the payload transmitter 310, TransmitterPrK.

At 343, the payload transmitter 310 may transmit the information payload, which may be received by the payload receiver 320. Although the information payload may be received at the payload receiver 320 at 343, the payload receiver may postpone further operations on, or processing of the information payload until the information payload is determined to be valid or authentic (e.g., according to operations of 347). In other words, the payload receiver 320 may cache the received information payload until an authentication determination is made.

At 344, the payload transmitter 310 may transmit the payload signature (e.g., signature1), which may be received by the payload receiver 320. In various examples, the communication of the information payload of 343 and the payload signature of 344 may occur at various times, including communications in an opposite order (e.g., transmitting the payload signature before transmitting the information payload), communications that overlap in time, or substantially shared or common transmission (e.g., where transmitting the information payload and transmitting the payload signature are considered to be a single communication), or other communication configurations.

In some examples, the payload signature may be encrypted (e.g., according to a private key of the payload transmitter 310, TransmitterPrK). In such examples, the reception at the payload receiver 320, or other subsequent processing, may include a decryption operation by the payload receiver 320. In some examples, the decryption at the payload receiver 320 may be based on a key provided to the payload receiver 320 (e.g., a public key of the payload transmitter 310, TransmitterPuK).

In some examples, at 345, the payload transmitter 310 may transmit other information to support the authentication of the information payload, which may be received by the payload receiver 320. For example, the payload transmitter 310 may transmit one or more of a device identifier (e.g., a device identifier used to generate signature1, the device identifier corresponding to the payload receiver 320 as received at 332, DeviceID), a nonce (e.g., a nonce used to generate signature1, a nonce generated by the payload transmitter 310, a nonce received at the payload transmitter 310), a monotonic count (e.g., a monotonic count used to generate signature1, a monotonic count incremented or otherwise cached or managed at the payload transmitter 310), or other information, which may be used by the payload receiver 320 in subsequent operations (e.g., at 346, at 347).

At 346, the payload receiver 320 may generate a signature, which may be referred to as "signature2" (e.g., a receiver-generated signature). In some examples, the generation of the signature at 346 may use the same function or equation as the generation of the payload signature at 342 by the payload transmitter 310, or may share aspects of such a generation. For example, the signature generated at 346 may also be based at least in part on the information payload (e.g., as received at 343) and the identifier corresponding to the payload receiver 320 (e.g., as transmitted by the payload receiver 320 at 332, as cached or stored at the payload receiver 320). In some examples, the signature generated at 346 may be an output of a hash function that includes at least the received information payload, or some portion thereof, and the identifier corresponding to the payload receiver 320.

The signature generated at 346 may also be based on additional information, which may have been previously communicated between the payload transmitter 310 and the payload receiver 320 (e.g., prior to the payload operations 340), or may accompany the communication of the information payload of 343 or the payload signature of 344 (e.g., as part of the payload operations 340). For example, the payload signature generated at 346 may be based at least in part on a nonce value, including aspects of a nonce value described with reference to the operations of 342. In various examples, a nonce value used to generate a signature at 346 may be the same as a nonce value used to generate a payload signature at 342 (e.g., as maintained at the payload receiver 320 and provided to the payload transmitter 310, as maintained at the payload transmitter 310 and received by the payload receiver 320).

The payload signature generated at 346 may also be based at least in part on a monotonic count value that may be shared between the payload transmitter 310 and the payload receiver 320, including aspects of a monotonic count value described with reference to the operations of 342. In various examples, a monotonic count used to generate a signature at 346 may be the same as a monotonic count used to generate a payload signature at 342 (e.g., as maintained at the payload receiver 320 and provided to the payload transmitter 310, as maintained at the payload transmitter 310 and received by the payload receiver 320, as maintained or incremented at both the payload transmitter 310 and the payload receiver 320).

In an illustrative example where the signature generated by the payload receiver 320 at 346 is based on the identifier corresponding to the payload receiver 320 (e.g., as provided at 332, as cached at the payload receiver 320), a nonce value, a monotonic count, and the information payload (e.g., as received at 344), the payload signature may be generated according to a formula that generally takes the form of:

signature2=Hash(DeviceId, nonce, monotonic count, payload)

where, the referenced "Hash" may be a hash function of various configurations, and may be a same hash function as used by the payload transmitter 310 at 342.

At 347, the payload receiver 320 may authenticate the information payload (e.g., as received at 343), which may include an authentication that is based at least in part on the signature generated at 346 (e.g., signature2) and the payload signature received at 344 (e.g., signature1). In various examples, the information payload may be authenticated, or otherwise determined as valid, when signature1 equals signature2, when signature1 matches signature 2, or when signature1 otherwise corresponds to signature2. In other words, at 347, the payload receiver 320 may determine whether the payload transmitter 310 or the information payload of 343 is authentic or not, or the payload receiver 320 may determine whether the payload transmitter 310 or the information payload of 343 is valid or not.

When the payload receiver 320 determines an affirmative authentication, or otherwise determines the information payload received at 343 to be valid, the payload receiver 320 may proceed to the operations of 348 (e.g., processing the information payload). In some examples, the payload receiver 320 may increment a monotonic count value based on authenticating the information payload as valid. When the payload receiver 320 does not determine an affirmative authentication, or otherwise determines the information payload received at 343 to be invalid, the payload receiver may refuse or ignore the information payload received at 343, or perform some other operation corresponding to an inauthentic information payload.

In some examples of the described techniques for payload validation, the authentication of 347 may be further based on an operation or comparison of the device identifier itself (e.g., the identifier corresponding to the payload receiver 320). For example, at 345, the payload transmitter 310 may also transmit the device identifier (e.g., as received at 332) used to generate the signature. In such examples, the authentication of 347 may be further based on the device identifier received by the payload receiver 320 at 345. For example, the payload receiver 320 may compare the device identifier received at 345 with a device identifier cached or maintained at the payload receiver 320, which may be the same as, or otherwise match or correspond to the identifier corresponding to the payload receiver 320 (e.g., as transmitted by the payload receiver at 332). An affirmative authentication at 347 may be based at least in part on the device identifier received by the payload receiver 320 at 345 matching the identifier cached at the payload receiver 320, and a determination that the information payload is invalid or inauthentic may be based at least in part on the device identifier received by the payload receiver 320 at 345 not matching the identifier cached at the payload receiver 320

At 348, the payload receiver 320 may process the information payload, which, in some examples, may be based on a positive authentication or validation of the information payload. In some examples, processing the information payload at 348 may include storing the information payload in a memory array of the payload receiver 320 that is configured to store information. In some examples, processing the information payload at 348 may include forwarding the information payload to another device, or to another subcomponent of the payload receiver 320. In some examples, processing the information payload at 348 may include performing operations or calculations based on the information payload, or executing instructions conveyed by the information payload.

In some examples, the payload receiver 320 may ignore the information payload based on a determination (e.g., at 347) that the payload transmitter 310, or the information payload, is invalid, inauthentic, not trusted, or malicious. In some examples, the payload receiver 320 may perform other operations based on such a determination. For example, the payload receiver 320 may block subsequent payloads from the payload transmitter 310, flag the payload transmitter 310 as invalid or inauthentic to a system (e.g., in a warning advertisement), flag the payload transmitter as being malicious to the system, or some other operation.

Thus, in accordance with the described techniques, a system may be configured such that information payloads may be validated or invalidated based at least in part on a device identifier corresponding to a payload receiver 320. The device identifier that corresponds to the payload receiver 320 may be used to generate signatures, may be compared directly, or a combination thereof. The described techniques may be advantageous over other techniques, including those that omit device identifiers as part of payload validation. For example, in a system that uses a count value without a device identifier for payload validation, an adverse device (e.g., an adverse payload transmitter 310) may detect a communication having a particular count value, and may generate an inauthentic signature based on the detected count value, or may replay a detected signature as an inauthentic signature. The inauthentic signature may be transmitted by the adverse device, which may be received by one or more payload receivers 320 as valid or authentic. In other words, if the inauthentic signature is legitimated, the adverse device may successfully perform a replay attack.

The described techniques for payload validation may avoid such an attack by an adverse device. For example, if an adverse device detects and records a generated based on an identifier corresponding to a first device signature (e.g., signatureA=Hash(DeviceID1, nonce, monotonic count, payload)), the adverse device may not be able to perform an attack on a second device having a different identifier (e.g., DeviceID2). Rather, a replay on the second device may fail, since the replayed signatureA may be different than a payload signature that would be valid at the second device (e.g., different than signatureB=Hash(DeviceID2, nonce, monotonic count, payload)). In some examples, the replay on the second device may also fail when the second device checks a received device identifier (e.g., a received DeviceID1) against its own device identifier (e.g., a maintained or cached DeviceID2). In either event, by comparing signatures generated based on identifiers corresponding to payload receivers 320, or by comparing identifiers corresponding to payload receivers 320 themselves, information payloads that are not authenticated as valid may be discarded without further processing.

Although described in the context of a memory device (e.g., a memory device 110) and a host device, the described techniques for payload validation may be applicable to other components or systems. For example, a payload receiver 320 may be a central controller, a server, a cloud storage device, or other device that is configured for payload transfer with a payload transmitter 310. In various examples, the communications between the payload transmitter 310 and the payload receiver 320 may be conveyed over wired (e.g., conductive) signal paths, wireless transmission medium, or various combinations thereof. Further, although illustrated as being direct communication between a payload transmitter 310 and a payload receiver 320, in some examples, such communications may be conveyed via other intervening components or devices.

Further, although the payload transmitter 310 and the payload receiver 320 are illustrated as being particular devices, such definitions may be made in the context of a particular information payload transfer. For example, a device that is a payload transmitter 310 for one payload transfer may be a payload receiver 320 for another payload transfer. Thus, the described techniques for payload validation may be generally applicable to various configurations of the system 300, including public key infrastructure (PKI) systems or asymmetric key systems, which may support the system 300 being less vulnerable to replay that can result from using one device's communication to communicate with another device. Moreover, the described techniques may be more generally applicable to any PKI system that uses a monotonic count for validation or authentication of information payloads.

Figure 4:
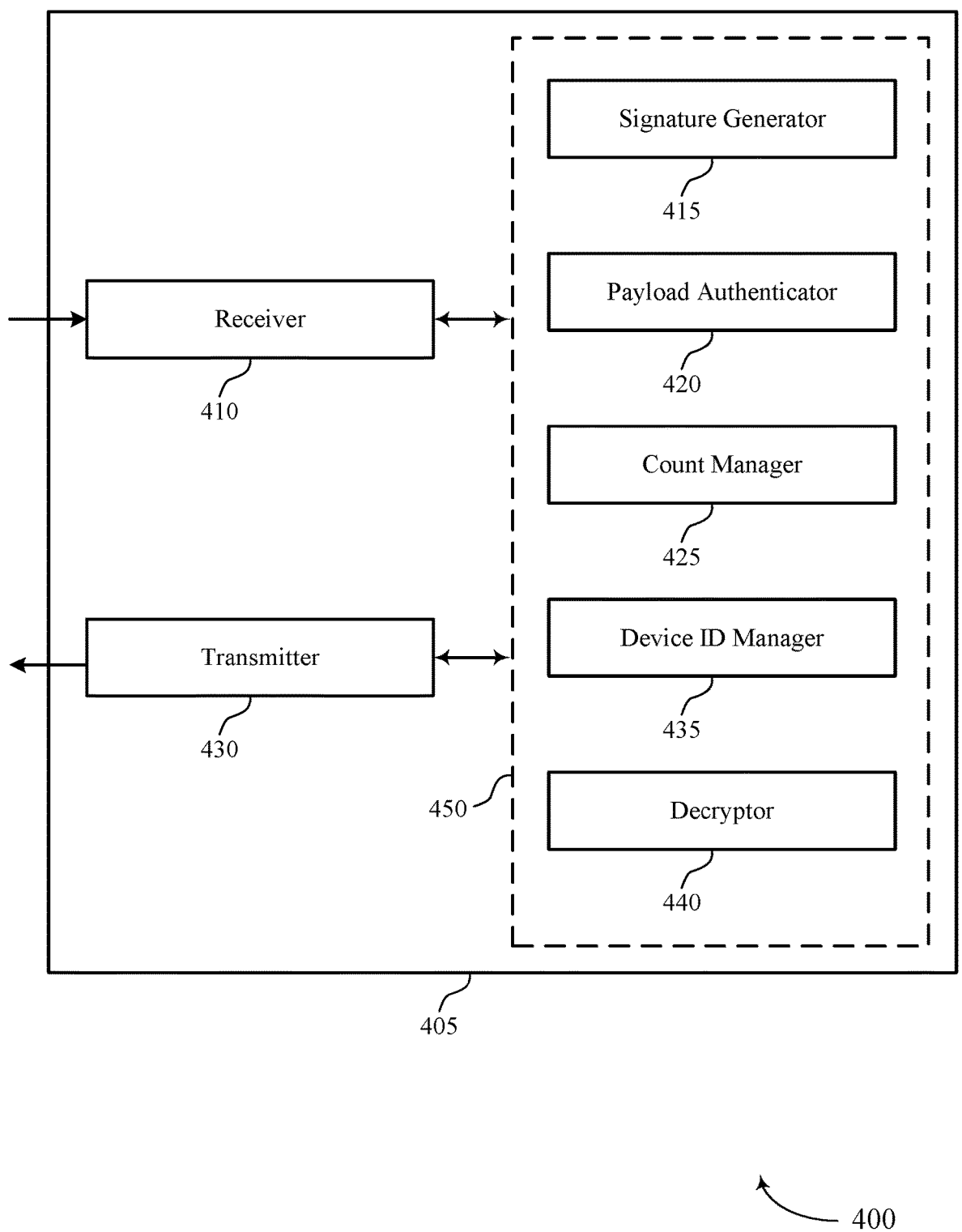
FIG. 4 illustrates a block diagram of a payload receiver that supports payload validation for a memory system in accordance with examples as disclosed herein.

FIG. 4 shows a block diagram 400 of a payload receiver 405 that supports payload validation for a memory system in accordance with examples as disclosed herein. The payload receiver 405 may be an example of aspects of a payload receiver 320 described with reference to FIG. 3. In various examples, the payload receiver 405 may be an example of a memory device 110 or a host device (e.g., an external memory controller 105) as described with reference to FIG. 1, or a device that includes a memory device 110 or a host device (e.g., a device that includes an array of memory cells configured to store data). The payload receiver 405 may include a receiver 410, a signature generator 415, a payload authenticator 420, a count manager 425, a transmitter 430, a device ID manager 435, and a decryptor 440. In some examples, the signature generator 415, the payload authenticator 420, the count manager 425, the device ID manager 435, or the decryptor 440, or any combination thereof, may be included in a controller 450 (e.g., a payload controller, a reception controller, a payload authentication or validation controller). Each of these components may communicate, directly or indirectly, with one another (e.g., via one or more buses).

The receiver 410 may be configured to receive an information payload and a first signature associated with the information payload, the first signature configured to provide sender authentication of the information payload to the payload receiver 405. In some examples, the receiver 410 may be configured to receive (e.g., from a payload transmitter, from a host device) a second identifier (e.g., associated with one or more payload receivers that may include the payload receiver 405, associated with one or more memory devices).

The signature generator 415 may be configured to generate a second signature based on an identifier of the payload receiver 405 and the information payload. In some examples, the signature generator 415 may be configured to generate a hash value based on the identifier of the payload receiver 405 and the information payload.

The payload authenticator 420 may be configured to authenticate the information payload as valid based on the first signature and the second signature. In some examples, the payload authenticator 420 may be configured to determine that the second signature matches the first signature. In some examples, authenticating the information payload as valid includes determining that the second identifier matches the identifier of the payload receiver 405.

The count manager 425 may be configured to identify a count value, and generating a hash value may be based on the count value. In some examples, the count manager 425 may be configured to increment the count value based on authenticating the information payload as valid.

The transmitter 430 may be configured to transmit the identifier of the payload receiver 405 to the payload transmitter (e.g., a host device) before receiving the second identifier.

The device ID manager 435 may be configured to receive a request (e.g., from a payload transmitter, from a host device) for the identifier of the payload receiver 405, and transmitting the identifier of the payload receiver 405 may be based on receiving the request.

The decryptor 440 may be configured to decrypt the first signature (e.g., when a received signature is an encrypted signature) using a public key associated with the private key.

Figure 5:
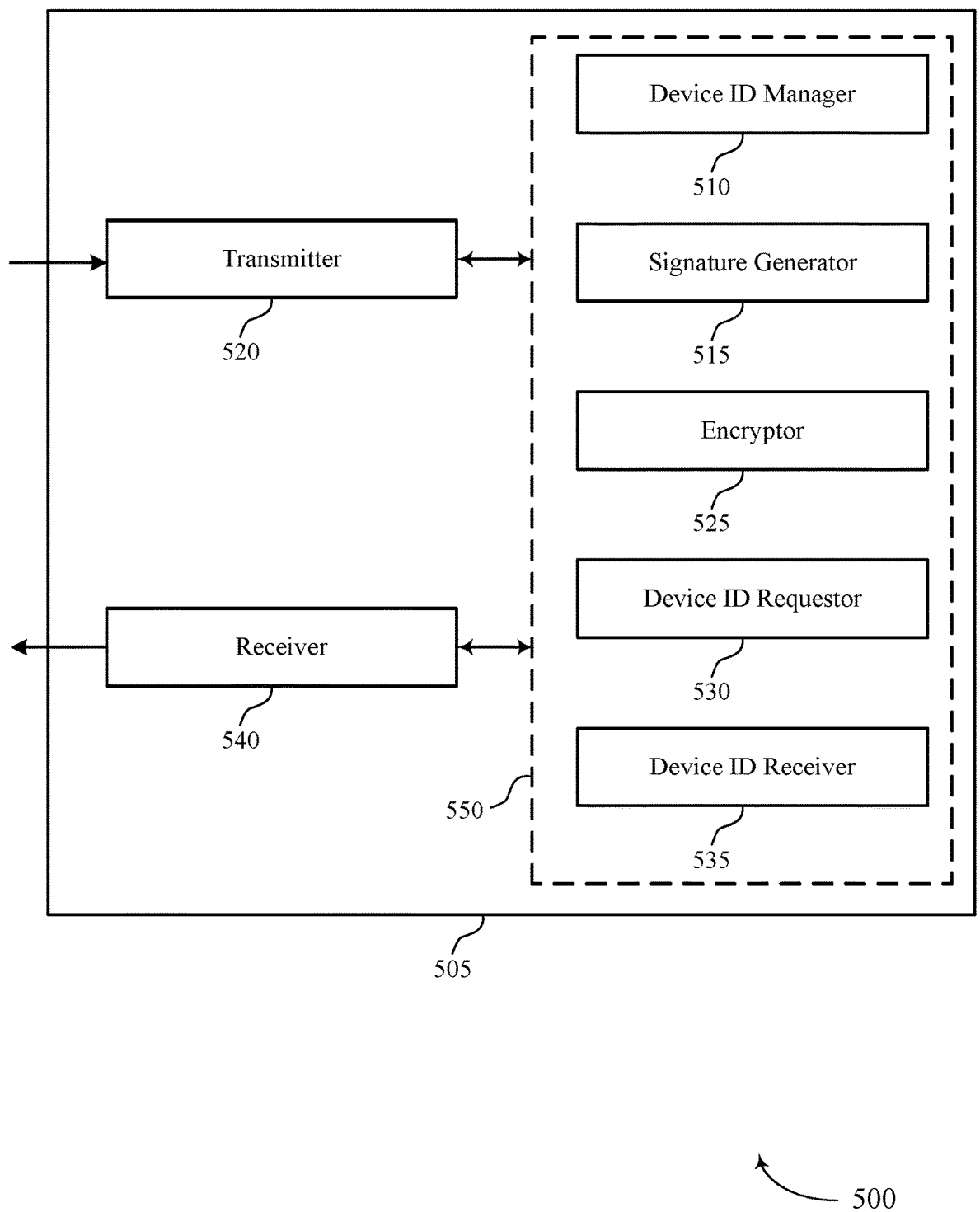
FIG. 5 illustrates a block diagram of a payload transmitter that supports payload validation for a memory system in accordance with examples as disclosed herein.

FIG. 5 shows a block diagram 500 of a payload transmitter 505 that supports payload validation for a memory system in accordance with examples as disclosed herein. The payload transmitter 505 may be an example of aspects of a payload transmitter 310 described with reference to FIG. 3. In various examples, the payload transmitter 505 may be an example of a memory device 110 or a host device (e.g., an external memory controller 105) as described with reference to FIG. 1, or a device that includes a memory device 110 or a host device (e.g., a device that includes an array of memory cells configured to store data). The payload transmitter 505 may include a device ID manager 510, a signature generator 515, a transmitter 520, an encryptor 525, a device ID requestor 530, and a device ID receiver 535. The device ID manager 510, the signature generator 515, the encryptor 525, the device ID requestor 530, or the device ID receiver 535, or any combination thereof, may be included in a controller 550 (e.g., a payload controller, a transmission controller, a payload authentication or validation controller). Each of these modules may communicate, directly or indirectly, with one another (e.g., via one or more buses).

The device ID manager 510 may identify an identifier associated with a payload receiver (e.g., a memory device 110, a device including an array of memory cells configured to store data).

The signature generator 515 may generate a signature associated with an information payload for the payload receiver, where the signature may include a hash value that is based on the information payload and the identifier and configured to provide sender authentication of the information payload to the payload receiver.

The transmitter 520 may transmit, to the payload receiver, the information payload and the signature. In some examples, the transmitter 520 may also transmit the identifier to the payload receiver.

The encryptor 525 may encrypt the signature based on a private key before the transmitting.

The device ID requestor 530 may transmit a request for the identifier to the payload receiver (e.g., during an initialization operation, during a handshake operation, in response to identifying the information payload).

The device ID receiver 535 may receive the identifier from the payload receiver based on transmitting the request, and identifying the identifier may be based on receiving the identifier from the payload receiver.

Figure 6:
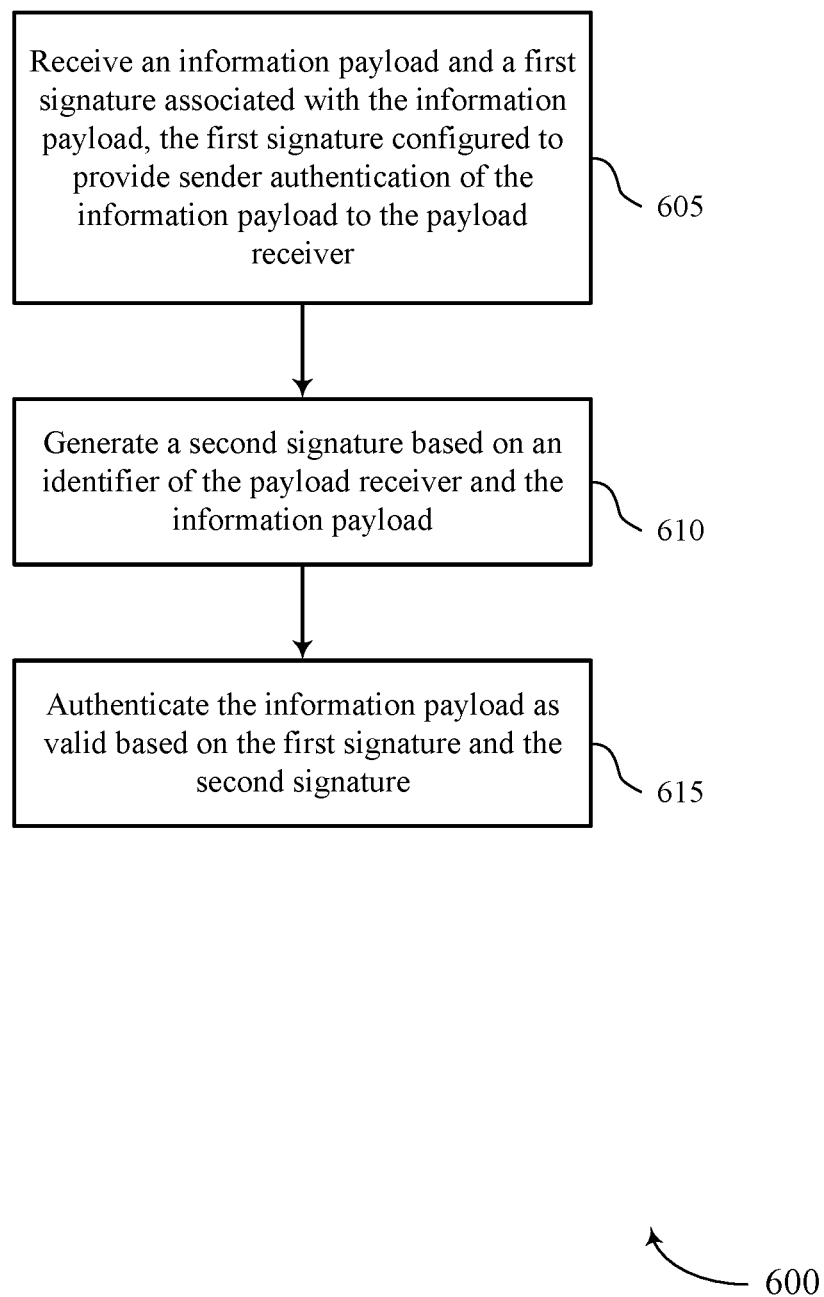
FIGS. 6 and 7 illustrate flowcharts showing a method or methods that support payload validation for a memory system in accordance with examples as disclosed herein.

FIG. 6 shows a flowchart illustrating a method or methods 600 that supports payload validation for a memory system in accordance with examples as disclosed herein. The operations of method 600 may be implemented by a payload receiver or its components as described herein, such as a payload receiver 320 described with reference to FIG. 3 or a payload receiver 405 described with reference to FIG. 4. In some examples, a payload receiver may execute a set of instructions to control the functional elements of the payload receiver to perform the described functions. Additionally or alternatively, a payload receiver may perform aspects of the described functions using special-purpose hardware. In some examples, the referenced payload receiver may be a memory device that performs the method 600, such as a memory device 110 described with reference to FIG. 1. In some examples, the referenced payload receiver may be a host device that performs the method 600, such as a device that hosts a memory device 110 described with reference to FIG. 1.

At 605, the payload receiver may receive an information payload and a first signature associated with the information payload, the first signature configured to provide sender authentication of the information payload to the payload receiver. The operations of 605 may be performed according to the methods described herein. In some examples, aspects of the operations of 605 may be performed by a receiver 410 described with reference to FIG. 4.

At 610, the payload receiver may generate a second signature based on an identifier of the payload receiver and the information payload. The operations of 610 may be performed according to the methods described herein. In some examples, aspects of the operations of 610 may be performed by a signature generator 415 described with reference to FIG. 4.

At 615, the payload receiver may authenticate the information payload as valid based on the first signature and the second signature. The operations of 615 may be performed according to the methods described herein. In some examples, aspects of the operations of 615 may be performed by a payload authenticator 420 described with reference to FIG. 4.

In some examples, an apparatus as described herein may perform a method or methods, such as the method 600. The apparatus may include features, means, or instructions (e.g., a non-transitory computer-readable medium storing instructions executable by a processor) for receiving an information payload and a first signature associated with the information payload, the first signature configured to provide sender authentication of the information payload to the apparatus, generating a second signature based on an identifier of the apparatus and the information payload, and authenticating the information payload as valid based on the first signature and the second signature.

In some examples of the method 600 and the apparatus described herein, generating the second signature may include operations, features, means, or instructions for generating a hash value based on the identifier of the payload receiver and the information payload.

Some examples of the method 600 and the apparatus described herein may further include operations, features, means, or instructions for identifying a count value, and generating the hash value may be based on the count value. Some examples of the method 600 and the apparatus described herein may further include operations, features, means, or instructions for incrementing the count value based on authenticating the information payload as valid.

Some examples of the method 600 and the apparatus described herein may further include operations, features, means, or instructions for receiving (e.g., from a payload transmitter, from a host device), a second identifier (e.g., associated with a payload transmitter, associated with one or more memory devices), and authenticating the information payload as valid may include determining that the second identifier matches the identifier of the payload receiver.

Some examples of the method 600 and the apparatus described herein may further include operations, features, means, or instructions for transmitting the identifier of the payload receiver to the payload transmitter (e.g., a host device) before receiving the second identifier. Some examples of the method 600 and the apparatus described herein may further include operations, features, means, or instructions for receiving a request from the payload transmitter (e.g., the host device) for the identifier of the payload transmitter, and transmitting the identifier of the payload receiver may be based on receiving the request.

In some examples of the method 600 and the apparatus described herein, authenticating the information payload as valid may include operations, features, means, or instructions for determining that the second signature matches the first signature.

Some examples of the method 600 and the apparatus described herein may further include operations, features, means, or instructions for decrypting the first signature using a public key associated with the private key.

Figure 7:
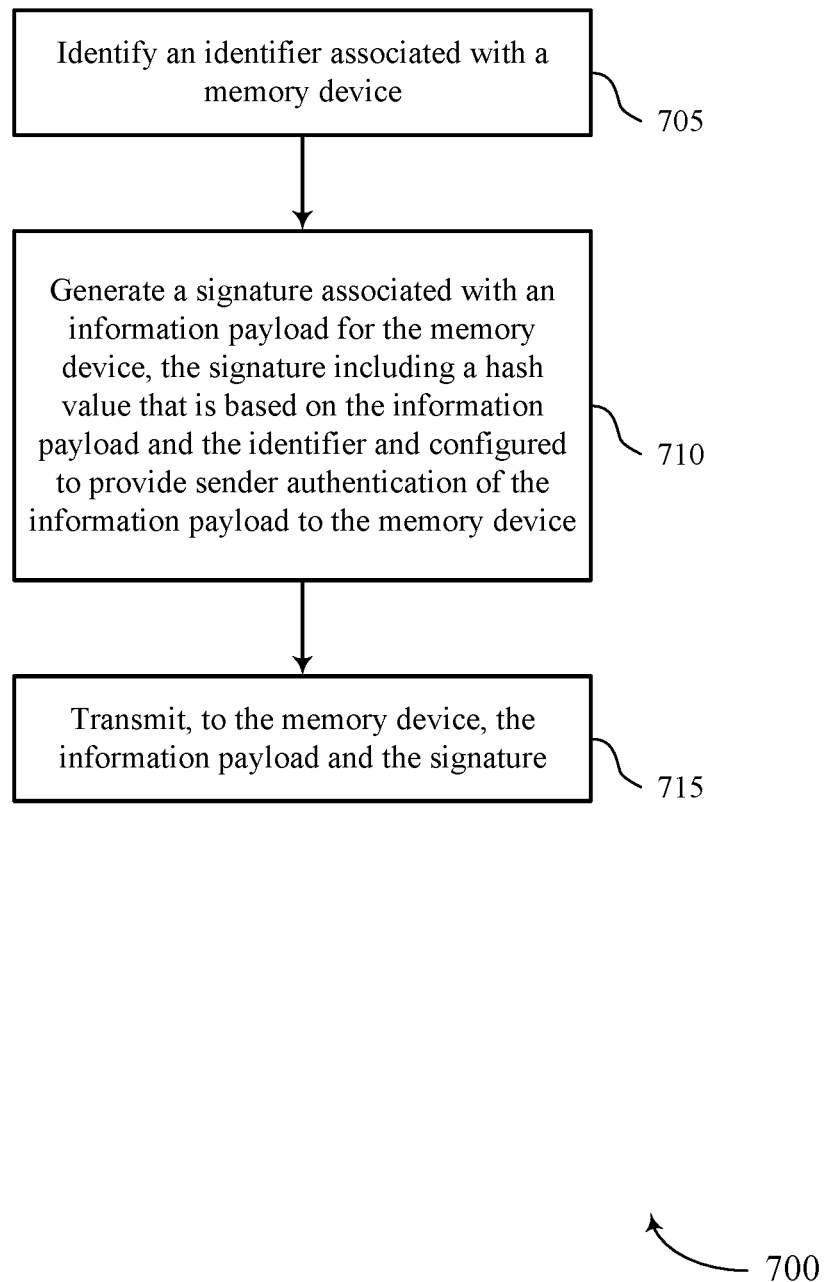

FIG. 7 shows a flowchart illustrating a method or methods 700 that supports payload validation for a memory system in accordance with examples as disclosed herein. The operations of method 700 may be implemented by a payload transmitter or its components as described herein. For example, the operations of method 700 may be performed by a payload transmitter 310 described with reference to FIG. 3 or a payload transmitter 505 described with reference to FIG. 5. In some examples, a payload transmitter may execute a set of instructions to control the functional elements of the payload transmitter to perform the described functions. Additionally or alternatively, a payload transmitter may perform aspects of the described functions using special-purpose hardware. In some examples, the referenced payload transmitter may be host device (e.g., a host of a memory device) that performs the method 700, such as an external memory controller 105 described with reference to FIG. 1. In some examples, the referenced payload transmitter may be a memory device that performs the method 700, such as a memory device 110 described with reference to FIG. 1.

At 705, the payload transmitter may identify an identifier associated with a payload receiver (e.g., a memory device, an apparatus including an array of memory cells configured to store data). The operations of 705 may be performed according to the methods described herein. In some examples, aspects of the operations of 705 may be performed by a device ID manager described with reference to FIG. 5.

At 710, the payload transmitter may generate a signature associated with an information payload for the payload receiver, the signature including a hash value that is based on the information payload and the identifier and configured to provide sender authentication of the information payload to the payload receiver. The operations of 710 may be performed according to the methods described herein. In some examples, aspects of the operations of 710 may be performed by a signature generator 515 described with reference to FIG. 5.

At 715, the payload transmitter may transmit, to the payload receiver, the information payload and the signature. The operations of 715 may be performed according to the methods described herein. In some examples, aspects of the operations of 715 may be performed by a transmitter 520 described with reference to FIG. 5.

In some examples, an apparatus as described herein may perform a method or methods, such as the method 700. The apparatus may include features, means, or instructions (e.g., a non-transitory computer-readable medium storing instructions executable by a processor) for identifying an identifier associated with a payload receiver (e.g., a memory device, a device including an array of memory cells configured to store data), generating a signature associated with an information payload for the payload receiver, the signature including a hash value that is based on the information payload and the identifier and configured to provide sender authentication of the information payload to the payload receiver, and transmitting, to the payload receiver, the information payload and the signature.

Some examples of the method 700 and the apparatus described herein may further include operations, features, means, or instructions for encrypting the signature based on a private key before the transmitting.

Some examples of the method 700 and the apparatus described herein may further include operations, features, means, or instructions for transmitting the identifier to the payload receiver. Some examples of the method 700 and the apparatus described herein may further include operations, features, means, or instructions for transmitting a request for the identifier to the payload receiver, and receiving the identifier from the payload receiver based on transmitting the request, where identifying the identifier may be based on receiving the identifier from the payload receiver.

In another example of the techniques described herein, an apparatus may include an array of memory cells configured to store data, a receiver configured to receive an information payload and a first signature that is associated with the information payload and that is encrypted using a private key, and a controller in communication with the array of memory cells and the receiver. The controller may be configured to cause the apparatus to generate a second signature based at least in part on an identifier of the apparatus and the information payload, and authenticate the information payload as valid based at least in part on the first signature and the second signature.

In some examples, to generate the second signature, the controller may be configured to cause the apparatus to generate a hash value based at least in part on the identifier of the apparatus and the information payload.

In some examples, the controller may be configured to cause the apparatus to identify a count value associated with the first signature, and generate the hash value based at least in part on the identified count value. In some examples, the controller may be configured to cause the apparatus to increment the count value based at least in part on authenticating the information payload as valid.

In some examples, the controller may be configured to cause the apparatus to receive, via the receiver, a second identifier of the apparatus, and authenticate the information payload as valid based at least in part on determining that the second identifier of the apparatus matches the identifier of the apparatus.

In some examples, the apparatus may include a transmitter configured to transmit the identifier of the apparatus, and the second identifier of the apparatus may be based at least in part on the transmitted identifier of the apparatus. In some examples, the receiver may be configured to receive a request for the identifier of the apparatus, and transmitting the identifier of the apparatus may be based at least in part on receiving the request.

In some examples, the controller may be configured to cause the apparatus to decrypt the first signature using a public key that is associated with the private key.

In some examples, to authenticate the information payload as valid, the controller may be configured to cause the apparatus to determine that the second signature matches the first signature.

In another example of the techniques described herein, an apparatus may include an array of memory cells configured to store information, a receiver configured to receive an information payload and a first hash value associated with the information payload, and a controller. The controller may be configured to cause the apparatus to generate a second hash value based at least in part on the information payload and an identifier of the apparatus, determine that the information payload is valid based at least in part on comparing the first hash value and the second hash value, and perform an operation based at least in part on determining that the information payload is valid.

In some examples, to determine that the information is valid, the controller may be configured to cause the apparatus to determine that the second hash value matches the first hash value.

In some examples, the receiver may be configured to receive a second identifier of the apparatus, and the controller may be configured to cause the apparatus to determine that the information payload is valid based at least in part on determining that the second identifier of the apparatus matches the identifier of the apparatus.

It should be noted that the methods, apparatuses, and other techniques described above describe possible implementations, and that the operations or features may be rearranged or otherwise modified and that other implementations are possible. Furthermore, portions from two or more of the methods or apparatuses may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
an array of memory cells configured to store data,
a receiver configured to receive an information payload and a first signature that is associated with the information payload and that is encrypted using a first private key, wherein the first signature is a first encrypted signature based at least in part on the first private key and a first hash function, the first hash function having a first set of inputs comprising a device identifier of the apparatus, a nonce value, a monotonic count, and the information payload, wherein the device identifier is a static identifier, and receive a second device identifier associated of the apparatus, and
a controller in communication with the array of memory cells and the receiver, the controller configured to cause the apparatus to:
decrypt the first signature using a public key associated with the first private key;
generate a second signature using a second hash function, the second hash function having a second set of inputs comprising the device identifier of the apparatus, the nonce value, the monotonic count, and the information payload, and wherein the second signature is a second encrypted signature based at least in part on a second private key and the second hash function;

authenticate the information payload as valid based at least in part on the first signature and the second signature and determining that the second device identifier of the apparatus matches the device identifier of the apparatus; and increment the monotonic count based at least in part on authenticating the information payload as valid.

2. The apparatus of claim 1, wherein, to generate the second signature, the controller is configured to cause the apparatus to:

generate a hash value based at least in part on the device identifier of the apparatus and the information payload.

3. The apparatus of claim 2, wherein the controller is configured to cause the apparatus to:

identify a count value associated with the first signature; and generate the hash value based at least in part on the identified count value.

4. The apparatus of claim 3, wherein the controller is configured to cause the apparatus to:

increment the count value based at least in part on authenticating the information payload as valid.

5. The apparatus of claim 1, further comprising:

a transmitter configured to transmit the device identifier of the apparatus, the second device identifier of the apparatus being based at least in part on the transmitted device identifier of the apparatus.

6. The apparatus of claim 5, wherein the receiver is configured to:

receive a request for the device identifier of the apparatus, wherein transmitting the device identifier of the apparatus is based at least in part on receiving the request.

7. The apparatus of claim 1, wherein, to authenticate the information payload as valid, the controller is configured to cause the apparatus to:

determine that the second signature matches the first signature.

8. An apparatus, comprising:

an array of memory cells configured to store information, a receiver configured to receive an information payload and a first hash value associated with the information payload, wherein the first hash value is associated with a first signature that is a first encrypted signature based at least in part on a first private key, the first hash value based at least in part on a first hash function, the first hash function having a first set of inputs comprising a device identifier of the apparatus, a nonce value, a monotonic count, and the information payload, wherein the device identifier is a static identifier, and receive a second device identifier of the apparatus, and a controller configured to cause the apparatus to:

decrypt the first signature using a public key associated with the first private key;

generate a second hash value based at least in part on a second hash function, the second hash function having a second set of inputs comprising the device identifier of the apparatus, the nonce value, the monotonic count, and the information payload, and wherein the second hash value is associated with a second signature that is a second encrypted signature based at least in part on a second private key;

determine that the information payload is valid based at least in part on comparing determining that the first hash value matches the second hash value, and determining that the second device identifier of the apparatus matches the device identifier of the apparatus; and perform an operation based at least in part on determining that the information payload is valid.

9. A method, comprising:

receiving, at a memory device, an information payload and a first signature associated with the information payload, the first signature configured to provide sender authentication of the information payload to the memory device, wherein the first signature is a first encrypted signature based at least in part on a first private key and a first hash function, the first hash function having a first set of inputs comprising a device identifier of the memory device, a nonce value, a monotonic count, and the information payload, wherein the device identifier is a static identifier;

receiving, from a host device, a second device identifier associated with one or more memory devices;

decrypting the first signature using a public key associated with the first private key;

generating, at the memory device, a second signature using a second hash function, the second hash function having a second set of inputs comprising the device identifier of the memory device, the nonce value, the monotonic count, and the information payload, and wherein the second signature is a second encrypted signature based at least in part on a second private key and the second hash function;

authenticating, at the memory device, the information payload as valid based at least in part on the first signature and the second signature, wherein authenticating the information payload as valid comprises determining that the second device identifier matches the device identifier of the memory device; and incrementing the monotonic count based at least in part on authenticating the information payload as valid.

10. The method of claim 9, wherein generating the second signature comprises:

generating a hash value based at least in part on the device identifier of the memory device and the information payload.

11. The method of claim 10, further comprising:

identifying a count value, wherein generating the hash value is based at least in part on the count value.

12. The method of claim 11, further comprising:

incrementing the count value based at least in part on authenticating the information payload as valid.

13. The method of claim 9, further comprising:

transmitting the device identifier of the memory device to the host device before receiving the second device identifier.

14. The method of claim 13, further comprising:

receiving a request from the host device for the device identifier of the memory device, wherein transmitting the device identifier of the memory device is based at least in part on receiving the request.

15. The method of claim 9, wherein authenticating the information payload as valid comprises:

determining that the second signature matches the first signature.

16. A method, comprising:

identifying a device identifier associated with a memory device, wherein the device identifier is a static identifier;

generating a signature associated with an information payload for the memory device, the signature comprising a hash value that is generated using a hash function having a set of inputs comprising the device identifier of the memory device, a nonce value, a monotonic count, and the information payload, wherein the signature is an encrypted signature based at least in part on a private key and the hash function, and wherein the signature is configured to provide sender authentication of the information payload to the memory device; and transmitting, to the memory device, the information payload and the signature.

17. The method of claim 16, further comprising:

encrypting the signature based at least in part on the private key before the transmitting.

18. The method of claim 16, further comprising:

transmitting the device identifier to the memory device.

19. The method of claim 16, further comprising:

transmitting a request for the device identifier to the memory device; and receiving the device identifier from the memory device based at least in part on transmitting the request, wherein identifying the device identifier is based at least in part on receiving the device identifier from the memory device.

* * * * *